United States Patent [19]
Langenbeck

[11] Patent Number: 5,789,839
[45] Date of Patent: Aug. 4, 1998

[54] AEROSTATIC AND AERODYNAMIC BEARING FOR A MOTOR

[76] Inventor: Peter Langenbeck, Rickertsweiler 3, D-88699 Frickingen, Germany

[21] Appl. No.: 807,319

[22] Filed: Feb. 27, 1997

Related U.S. Application Data

[63] Continuation of Ser. No. 374,235, Jan. 18, 1995, abandoned.

[30] Foreign Application Priority Data

Jan. 18, 1994 [DE] Germany .............. 44 01 262.4

[51] Int. Cl.⁶ ........................................... H02K 7/09
[52] U.S. Cl. ................. 310/90.5; 310/90; 310/67 R; 310/68 R; 310/254; 310/261; 384/101; 384/107; 384/108; 384/109
[58] Field of Search ..................... 310/90.5, 254, 310/261, 67 R, 68 R, 90; 384/101, 107, 108, 109

[56] References Cited

U.S. PATENT DOCUMENTS

| | | | |
|---|---|---|---|
| 3,439,962 | 4/1969 | Gothberg | 308/9 |
| 3,447,841 | 6/1969 | Fernlund | 308/9 |
| 4,037,887 | 7/1977 | Germain | 3058/72 |
| 4,095,855 | 6/1978 | Fox | 308/9 |
| 4,998,033 | 3/1991 | Hisabe et al. | 310/67 R |
| 5,069,515 | 12/1991 | Itami et al. | 359/200 |
| 5,097,164 | 3/1992 | Nakasugi et al. | 310/88 |
| 5,103,335 | 4/1992 | Sugiura | 359/212 |
| 5,283,491 | 2/1994 | Jabbar et al. | 310/90 |

*Primary Examiner*—Steven L. Stephan
*Assistant Examiner*—Elvin G. Enad
*Attorney, Agent, or Firm*—Brown, Martin, Haller & McClain, LLP

[57] ABSTRACT

The invention relates to a high precision axial and radial aerostatic and aerodynamic bearing for a motor. The bearing surfaces of the stator and the rotor are of a toroidal shape.

9 Claims, 2 Drawing Sheets

AEROSTATIC AND AERODYNAMIC BEARING FOR A MOTOR

This is a continuation of application Ser. No. 08/374,235, filed Jan. 18, 1995 now abandoned.

BACKGROUND OF THE INVENTION

The invention relates to an aerostatic and aerodynamic bearing for a motor. Such kind of bearings are used as bearings with low friction.

Said bearings are commonly used for precision engineering applications, such as electronic memory unit drives and optical transmission apparatus. Such devices are containing generally a shaft centered in the motor having a radial and axial bearing which has a one side air bearing or a mechanical pivot point and also magnetic biasing.

The maximal required tolerances concerning radial run-out and plan run of the bearing in the sub-micrometer range can be nowadays technically achieved with high effort and assembling risk.

Most troublesome are the well known, not repeatable deviations which are not caused by manufacturing tolerances but have their origin in the randomness of the lubricant flow. In the preferred application of the invention (hard disk drives), it is known that the smaller the diameter of the bearing the bigger are the deviations. The possible deviations within the limits of the bearing clearance, especially the angular deviation, are of higher values with diameters extending beyond the bearing.

SUMMARY OF THE INVENTION

The object of the invention is to improve a bearing with low friction to minimize the not repeatable deviations of the bearing.

The absolute bearing clearance and the absolute deviation of position are largely independent of the diameter of the bearing. Therefore, the first step of the invention is to enlarge the bearing diameter to allow an arrangement of the motor inside the bearing. Compared to a conventional bearing "inside," the disk deviations get smaller as it can be seen already from the geometry.

With a bigger diameter and a fixed rotation speed, a higher relative speed between rotor and stator is achieved which especially improves the hydromatic, dynamic pumping effect. The aerodynamic pumping structure of the toroid bearing can be controlled by aerodynamic profiles on the bearing surface; e.g., the pumping can be inside delivery (=no air flow) or outside delivery (=with air flow). An outside delivering bearing with forced ventilation can be used as a reaction air turbine. The caused radial force has to be compensated by methods of biasing which will be described later on. The biasing can also be easily achieved by a plan bearing in an aerostatic or aerodynamic way.

A bigger bearing surface allows a higher rate of biasing and therefore a higher stiffness.

To solve these problems, known bearing solutions are a combination of a cylindrical bearing zone with a magnetically biased plan bearing zone. Because of also known assembling difficulties, we are rejecting such a solution. One could imagine also conical bearing surfaces, but they are also problematic: Is the angle of the cone sufficiently obtuse; e.g., 45° to avoid self-locking, then the centering of the bearing is affected.

The second inventive step is therefore the choice of a bearing cross-section which combines the advantages of a cone—very easy assembling, with a plan/cylindrical bearing—optimal definition of radial and plan run-out.

A third inventive step is directed to the kind of axial biasing. It should be compensated at least during the start period. An electromagnetic solution is proposed. It can be located in the now free inner space of the motor. A part of this third step is a further relief of the rotor by means of a mechanical supporting bearing in the form of a small ball arranged in the gravity center of the rotor which will be retracted (electromagnetically) during operation of the unit so that only the aerodynamic bearing is effective.

An important advantage of the invention is that due to the toroidal design in relation of a defined volume of the bearing, the effective surface of the bearing is larger, compared to bearing surface of a conical bearing with the same volume.

Larger bearing surfaces give the advantage that the bearing is carrying well and the load vectors meet in a ring surface (develop a ring surface) wherein the ring surface is close to the used surface making misalignment of the bearing nearly impossible.

Another advantage in using such a toroid bearing is that only two simple bearing parts (rotor and stator) need to be manufactured which have to be congruent to each other. There is no need anymore to assemble a bearing having multiple parts.

The fact that the bearing is biased magnetically makes it possible to reverse the polarity of the used electromagnet during the start and stop phase of the motor to enlarge the clearance during the start and stop periods. Thus, a better starting characteristic of the motor is achieved.

The advantage is far better abrasion and far less need of motor power during the starting period.

Therefore, it is possible to use a smaller motor and a smaller motor control unit, without urging the motor to start with high starting currents.

Producing such a toroidal bearing leads to another advantage that for manufacturing only a single clamping area is necessary which simplifies manufacturing. To achieve the required precision, rotor and stator can be clamped together in a clamping device by means of a pre-setable locking tool.

In manufacturing the bearing, according to the invention, punched out or embossed parts may be used without the need of machining the part in a lathe afterwards. The surface normals (direction of the effective bearing force) intersect in a circle out of the volume of the rotor.

The parts of the bearing can be manufactured in one clamping tool and the assembling is not critical. The bearing may be operated statically or dynamically.

The bearing is self-centering in radial direction but needs biasing in axial direction.

The enlargement of the diameter of the bearing is a disadvantage in the start and stop period of the motor when operating the bearing only aerodynamically. The force of braking the oil seal has to be high enough, at least higher as in bearings located inside the motor.

BRIEF DESCRIPTION OF THE DRAWINGS

The present invention will be better understood from the following detailed description of the preferred embodiments of the invention, taken in conjunction with the accompanying drawings, in which like reference numerals refer to like parts, and in which.

DETAILED DESCRIPTION OF THE PREFERRED EMBODIMENTS

Figure 1:
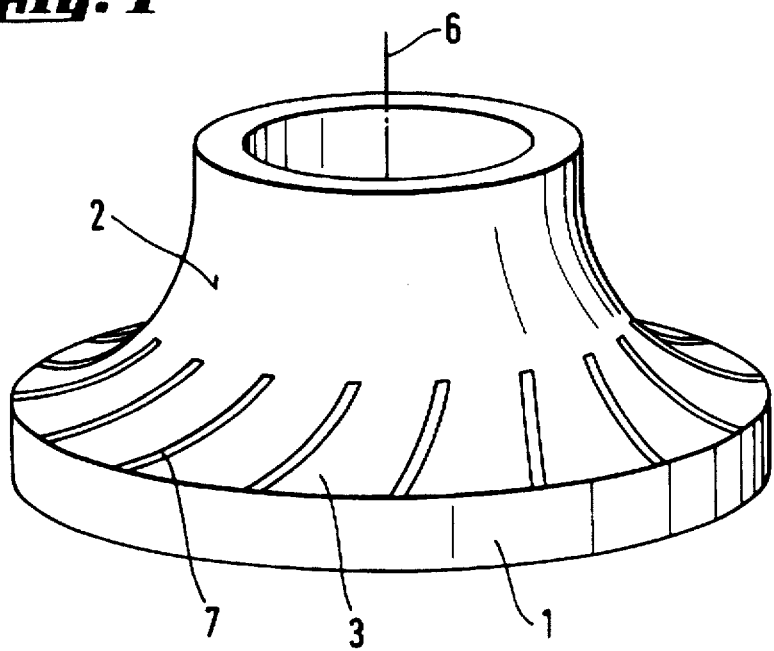
FIG. 1 is a perspective view schematically showing the rotor of the bearing.
Figure 2:
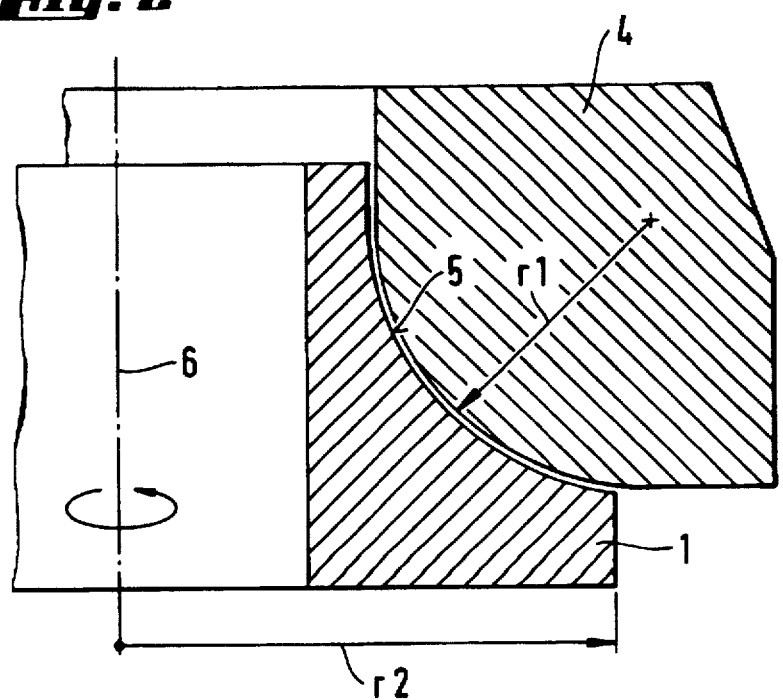
FIG. 2 is a sectional view of the bearing with a toroid angle of 90°.

FIG. 1 shows schematically the rotating part of the bearing; i.e., the rotor 1 which cross-section has the form of a toroidal curve 2. As illustrated in FIG. 2, the rotor 1 rotates about rotational axis 6, and the toroidal curve 2 faces outwardly away from axis 6. In a well known manner, aerodynamic profiles 7 are arranged on the toroidal bearing surface which causes the pumping effect when the rotor 1 is turning. With a suitable design of the profiles 7, it is possible to achieve an air flow rate through the bearing similar to an air turbine.

Figure 3:
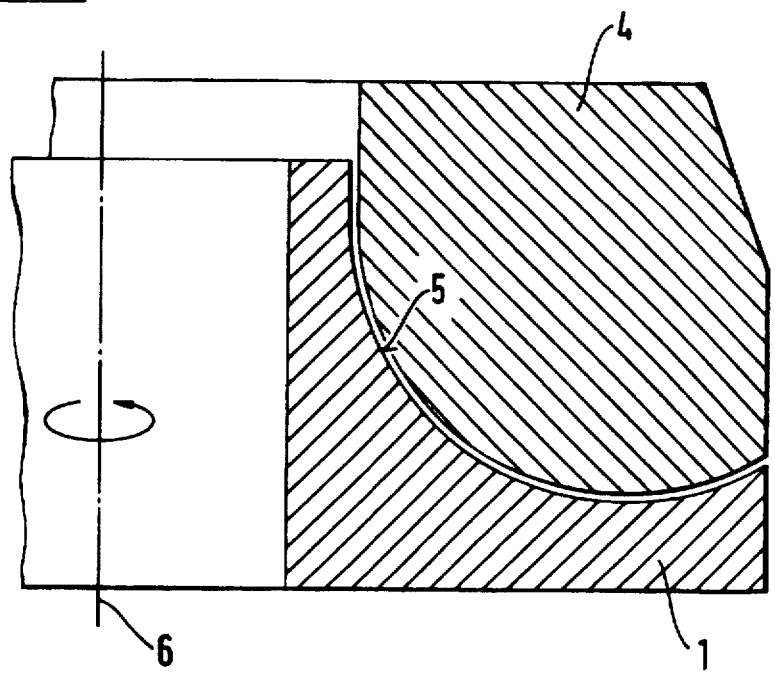
FIG. 3 is a sectional view of the bearing with a toroid angle of 120°.
Figure 4:
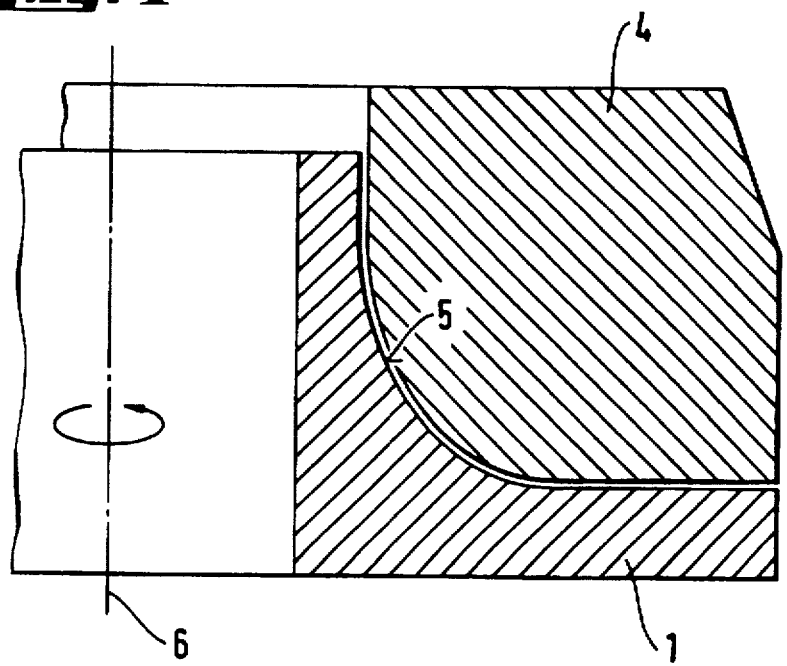
FIG. 4 is a sectional view of the bearing with a varying toroid radius.

FIGS. 2, 3 and 4 show how the rotor 1 is integrated in the bearing bush; i.e., the stator 4. The radius of the toroid curve 2, which is the radius of the bearing face 5, is designated as radius r1, and the radius of the bearing rotor, that means the circulation radius, as radius r2. As illustrated in FIG. 2, the radius r2 of the bearing rotor is centered on rotation axis 6. The radius r1 of the concave bearing face 5 is centered outwardly of axis 6, at a location aligned with the outer cylindrical face of rotor 1, as illustrated in FIG. 2. Thus, radius r2 has a center independent from rotational axis 6, and radius r2 is independent from radius r1. The ratio of the radius r1/r2 can have values between 1 (r1=r2) and very small values (r1<<r2).

The radius r1 can also have angles in the region of 0° and 180°, preferably between 0° and 120°. An angle of 90° is shown in FIG. 2; an angle of 120° shown in FIG. 3.

It is also possible that the radius r1 is changing along the toroid curve 5, and assuming infinite values, especially in the angular regions of 0° and 90°. That means that in the vertical direction, the toroid turns over in a cylindrical surface and/or in a horizontal direction in a planar surface. This is schematically shown in FIG. 4.

Although preferred embodiments of the present invention have been described above by way of example only, it will be understood by those skilled in the field that modifications may be made to the disclosed embodiments without departing from the scope of the invention, which is defined by the appended claims.

I claim:

1. High precision axial and radial aerostatic and aerodynamic bearing for a rotor, comprising a rotor and a stator both having a single toroidal bearing surface, the rotor having an axis of rotation and the toroidal bearing surface of the rotor comprising a concave bearing surface facing outwardly away from the axis of rotation; the concave bearing surface having a radius r1 with a center spaced outwardly from said rotation axis and defining a circle when said rotor is rotated, and the rotor having a rotation radius r2 about the axis of rotation which is independent from said bearing surface radius r1.

2. A bearing according to claim 1, wherein said toroidal bearing surface defines a radius r1 with an angle between 0° and 180°, preferably between 0° and 120°.

3. A bearing according to claim 1, wherein said toroidal bearing surface has a radius r1 which is variable along said bearing surface.

4. A bearing according to claim 1, wherein said rotor has pairs of runways counteracting with each other.

5. A bearing according to claim 1, with biasing means stabilizing said rotor in an axial direction.

6. A bearing according to claim 5, wherein the biasing means has magnetic poles between which magnetic forces are generated.

7. A bearing according to claim 6, wherein the magnetic biasing is generated electromagnetically, whereas during the start and stop period the poles are reversed so as to press said rotor against a central run-up bearing (jewel).

8. The bearing as claimed in claim 1, wherein the rotor has an annular, outwardly facing rim adjacent said concave bearing surface which is centered on the rotation axis and defines said radius r2, said concave bearing surface radius r1 having a center aligned with said annular rim.

9. A bearing according to claim 8, wherein said radius r1 is less than said radius r2.

\* \* \* \* \*